United States Patent [19]

Irifune et al.

[11] Patent Number: 5,696,180
[45] Date of Patent: Dec. 9, 1997

[54] RADIATION-CURABLE ORGANOPOLYSILOXANE COMPOSITION

[75] Inventors: Shinji Irifune; Toshio Ohba, both of Gunma-ken, Japan

[73] Assignee: Shin-Etsu Chemical Co., Ltd., Tokyo, Japan

[21] Appl. No.: 682,011

[22] Filed: Jul. 16, 1996

[30] Foreign Application Priority Data

Jul. 17, 1995 [JP] Japan ................................ 7-179865

[51] Int. Cl.$^6$ .................................................. C08G 77/20
[52] U.S. Cl. .................................... 522/99; 528/32
[58] Field of Search ............................... 522/99; 528/32

[56] References Cited

U.S. PATENT DOCUMENTS

| | | | |
|---|---|---|---|
| 4,608,270 | 8/1986 | Varprath | 427/35 |
| 4,824,875 | 4/1989 | Gutek | 522/9 |
| 4,996,243 | 2/1991 | Rasmussan et al. | 522/99 |
| 5,008,301 | 4/1991 | Dennis | 522/13 |
| 5,036,114 | 7/1991 | Lutz et al. | 522/20 |
| 5,436,281 | 7/1995 | Irifune et al. | 522/99 |

*Primary Examiner*—Ralph H. Dean
*Attorney, Agent, or Firm*—Millen, White, Zelano & Branigan, P.C.

[57] ABSTRACT

Proposed is a radiation-curable organopolysiloxane composition which is useful as a coating agent for the formation of a releasable coating film on a substrate to serve as a releasable sheet without the problem due to generation of peeling noises. The composition essentially comprises, as a blend, (a) a first organopolysiloxane having a specified viscosity and containing (meth)acryloxyalkyl groups bonded to the silicon atoms in a specified content and (b) a second organopolysiloxane having a specified viscosity and containing (meth)acrylaminoalkyl groups bonded to the silicon atoms in a specified content, the weight proportion of the second organopolysiloxane to the first organopolysiloxane being in a specified range.

14 Claims, No Drawings

RADIATION-CURABLE ORGANOPOLYSILOXANE COMPOSITION

BACKGROUND OF THE INVENTION

The present invention relates to a radiation-curable organopolysiloxane composition or, more particularly, to a radiation-curable organopolysiloxane composition suitable for use as a surface-releasable coating agent for the treatment of the back surface of pressure-sensitive adhesive tapes or releasable paper sheet for temporary protection of pressure-sensitive adhesive labels to be bonded to the substrate surface by an automatic machine by virtue of the excellent surface-releasability exhibited by the cured film of the composition without generating peeling noises.

It is known in the prior art that a radiation-curable organopolysiloxane composition, which comprises, as the principal ingredient, an organopolysiloxane having (meth) acryloxy groups in the molecule, is used in the above mentioned applications. Several proposals have been made heretofore for the preparation of the above mentioned (meth) acryloxy group-containing organopolysiloxane including the method in which (meth)acryloxy groups are introduced into the molecules of an organopolysiloxane by utilizing the ring-opening addition reaction of epoxy groups as disclosed in Japanese Patent Kokai 63-135426 and 2-45533 and the method in which (meth)acryloxy groups are introduced into the molecules of an organopolysiloxane by utilizing the hydrosilation reaction between silicon-bonded hydrogen atoms and ethylenically unsaturated linkages as disclosed in Japanese Patent Kokai 48-48000 and 2-163166.

Radiation-curable organopolysiloxane compositions of the above described types are mainly used as a coating agent for a surface treatment because a cured surface film thereof exhibits excellent releasability from various kinds of sticky substances when such a composition is used as a surface-releasing coating agent for the treatment of the back surface of pressure-sensitive adhesive tapes or releasable paper sheet for temporary protection of pressure-sensitive adhesive labels.

In recent years, on the other hand, it is a trend that the attacking works of pressure-sensitive adhesive tapes and labels are performed by using automatic machines at a high velocity so that the force required for unwinding of the tape from a roll or peeling of the labels from the releasable sheet is necessarily quite large. As a consequence, the force on the pressure-sensitive adhesive tape or releasable sheet is under a large stretching force and eventually causes vibration of the tape or sheet generating a noise called a peeling noise resulting in a problem on the working environment.

The disadvantage resulting from generation of the peeling noise is not limited to the problem of the working environment but involves a problem of decrease in the quality of the attaching works of the tapes and labels because the attaching machine is so designed that the tapes or labels can be attached accurately to a correct position only when the stretching force thereon is within a certain range and the machine can no longer work normally when the peeling force is under unduly large fluctuations.

Since the peeling noise is little generated when the peeling force is small but is generated with a substantial intensity when the peeling force exceeds a certain value, it is eagerly desired to develop a surface-releasing agent capable of giving a releasable cured film which is free from generation of peeling noises even under a large peeling force.

SUMMARY OF THE INVENTION

The present invention accordingly has an object to provide a novel radiation-curable organopolysiloxane composition suitable for use as a surface-releasing agent to be free from the above described problems and disadvantages in the prior art compositions used in the same applications.

Thus, the radiation-curable organopolysiloxane composition provided by the present invention is a uniform blend which comprises:

(a) a first organopolysiloxane having a viscosity in the range from 100 to 3000 centipoise at 25° C. and represented by the general formula

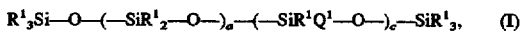

in which $Q^1$ is a group represented by the general formula

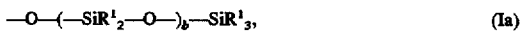

$R^1$ is an atom or group selected from the group consisting of a hydrogen atom, alkyl groups having 1 to 4 carbon atoms, phenyl group and an ω-(meth)acryloxyalkyl group represented by the general formula

$R^2$ being a hydrogen atom or a methyl group and the subscript n being an integer of 1, 2 or 3, with the proviso that from 5 to 20% of the groups denoted by $R^1$ in a molecule are the ω-(meth)acryloxyalkyl groups represented by the above given general formula (II), the subscript a is a positive integer and the subscripts b and c are each zero or a positive integer; and (b) a second organopolysiloxane having a viscosity in the range from 3000 to 30000 centipoise at 25° C. and represented by the general formula

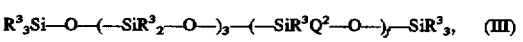

in which $Q^2$ is a group represented by the general formula

$R^3$ is an atom or group selected from the group consisting of a hydrogen atom, alkyl groups having 1 to 4 carbon atoms, phenyl group and an ω-(meth)acrylaminoalkyl group represented by the general formula

$R^4$ being a hydrogen atom or an alkyl group having 1 to 4 carbon atoms, $R^5$ being a hydrogen atom or a methyl group and the subscript m being an integer of 1, 2 or 3, with the proviso that at least one but not exceeding 3% of the groups denoted by $R^3$ in a molecule are the ω-(meth) acrylaminoalkyl groups represented by the above given general formula (IV), the subscript d is a positive integer and the subscripts e and f are each zero or a positive integer, in a weight ratio of the component (b) to the component (a) in the range from 10:90 to 40:60.

DETAILED DESCRIPTION OF THE PREFERRED EMBODIMENTS

As is described above, the most characteristic feature of the inventive radiation-curable organopolysiloxane composition is that the principal ingredient thereof is a combination of two different types of organopolysiloxanes as the components (a) and (b).

The first organopolysiloxane as the component (a) is represented by the above given general formula (I). The symbol $R^1$ in the general formula (I) denotes an atom or group selected from the group consisting of a hydrogen atom, alkyl groups having 1 to 4 carbon atoms, e.g., methyl, ethyl, propyl and butyl groups, phenyl group and ω-(meth) acryloxyalkyl groups represented by the general formula (II). It is essential that from 5 to 20% in number of the groups denoted by $R^1$ in a molecule are the groups of the general formula (II) while the rest of the groups $R^1$ other than the groups of the formula (II) are preferably methyl groups in respect of the simple and convenient procedure for the synthetic preparation of the organopolysiloxane and excellent surface releasability exhibited against sticky substances. The symbol $R^2$ denotes a hydrogen atom or a methyl group but $R^2$ is preferably a hydrogen atom. Although the subscript n in the general formula (II) can be 1, 2 or 3, the value of n is preferably 3.

As is mentioned above, from 5% to 20% or, preferably, from 8% to 15% of the groups denoted by $R^1$ in a molecule of the first organopolysiloxane should be the ω-(meth) acryloxyalkyl groups of the general formula (II). This is because, when the content of the ω-(meth)acryloxyalkyl groups is too low, the radiation-curability of the composition is greatly decreased while, when the content thereof is too high, a great decrease is caused in the releasability of the cured film of the composition from a sticky surface although the radiation-curability of the composition can be increased so high.

It is further essential that the first organopolysiloxane as the component (a) has a viscosity in the range from 100 to 3000 centipoise or, preferably, from 200 to 1000 centipoise at 25° C. because, when the viscosity thereof is too low, a decrease is caused in the radiation-curability of the composition while, when the viscosity thereof is too high, the viscosity of the composition containing the same is also unduly high so that the workability of coating of a substrate with the composition is decreased. The factors determinant to this viscosity requirement for the organopolysiloxane as the component (a) are the values of the subscripts a, b and c, a being a positive integer and b and c each being zero or a positive integer, so that the values of these subscripts should be adequately selected to satisfy the viscosity requirement for the organopolysiloxane. The value of the subscript c is preferably zero or a positive integer of 1, 2 or 3 or, more preferably, zero or 1.

The second organopolysiloxane as the component (b) to be combined with the component (a) is represented by the above given general formula (III). The symbol $R^3$ in the general formula (III) denotes an atom or group selected from the group consisting of a hydrogen atom, alkyl groups having 1 to 4 carbon atoms, e.g., methyl, ethyl, propyl and butyl groups, phenyl group and ω-(meth)acrylaminoalkyl groups represented by the general formula (IV). It is essential that each molecule of the organopolysiloxane has at least one ω-(meth)acrylaminoalkyl group but the fraction of the ω-(meth)acrylaminoalkyl groups in the overall groups denoted by $R^3$ in a molecule should not exceed 3% in number while the rest of the groups $R^3$ other than the groups of the formula (IV) are preferably methyl groups in respect of the simple and convenient procedure for the synthetic preparation of the second organopolysiloxane and excellent surface releasability exhibited by the organopolysiloxane composition against sticky substances. The symbol $R^4$ denotes a hydrogen atom, methyl group, ethyl group, propyl group or butyl group but $R^4$ is preferably a hydrogen atom. $R^5$ is preferably a hydrogen atom. Although the sub script m in the general formula (IV) can be 1, 2 or 3, the value of m is preferably 3.

As is mentioned above, a limited fraction of the groups denoted by $R^3$ in a molecule of the organopolysiloxane must be the ω-(meth)acrylaminoalkyl groups of the general formula (IV). This is because, when the organopolysiloxane molecule contains no ω-(meth)acrylaminoalkyl groups, the radiation-curability of the composition is greatly decreased while, when the content thereof is too high, peeling noises are sometimes generated in conducting peeling of pressure-sensitive adhesive tapes or labels although the radiation-curability of the composition can be increased thereby. It is preferable that from 0.1% to 1% in number of the groups denoted by $R^3$ are the ω-(meth)acrylaminoalkyl groups of the general formula (IV).

It is further essential that the second organopolysiloxane as the component (b) has a viscosity in the range from 3000 to 30000 centipoise or, preferably, from 5000 to 15000 centipoise at 25° C. because, when the viscosity thereof is too low, peeling noises are sometimes caused in conducting peeling of the pressure-sensitive adhesive tapes or labels while, when the viscosity thereof is too high, the viscosity of the composition containing the same is also unduly high so that the workability of coating of a substrate with the composition is decreased. The factors determinant to this viscosity requirement for the organopolysiloxane as the component (b) are the values of the subscripts d, e and f, d being a positive integer and e and f each being zero or a positive integer, so that the values of these subscripts should be adequately selected to satisfy the viscosity requirement for the organopolysiloxane. The value of the subscript f is preferably zero or a positive integer of 1, 2 or 3 or, more preferably, zero or 1.

The second organopolysiloxane as the component (b) is represented by the above given general formula (III). The symbol $R^3$ in the general formula (III) denotes a hydrogen atom, an alkyl group having 1 to 4 carbon atoms such as methyl, ethyl, propyl and butyl groups, a phenyl group or an ω-(meth)acrylaminoalkyl group represented by the general formula (IV) with the proviso that each of the molecules of the organopolysiloxane has at least one ω-(meth) acrylaminoalkyl group but the number of the ω-(meth) acrylaminoalkyl groups in a molecule does not exceed 3% of all of the groups denoted by $R^3$. In the general formula (IV), the subscript m is 1, 2 or 3 or, preferably, 3, $R^4$ is a hydrogen atom, methyl group, ethyl group or butyl group or, preferably, a hydrogen atom and $R^5$ is preferably a hydrogen atom. The groups denoted by $R^3$ other than the ω-(meth) acrylaminoalkyl groups of the general for-mula (IV) are preferably methyl groups in respect of the simple and convenient procedure for the synthetic preparation of the organopolysiloxane and excellent surface releasability exhibited by the cured coating film of the composition against sticky substances.

When the second organopolysiloxane as the component (b) has no ω-(meth)acrylaminoalkyl group in the molecule, a great decrease is caused in the radiation-curability of the organopolysiloxane composition. When the content of the ω-(meth)acrylaminoalkyl groups in a molecule is too large, on the other hand, the releasable paper sheet prepared by using the organopolysiloxane composition suffers from generation of peeling noises. In this regard, it is preferable that the content of the ω-(meth)acrylaminoalkyl groups in a molecule of the second organopolysiloxane is in the range from 0.1 to 1% of all of the groups denoted by $R^3$.

The second organopolysiloxane as the component (b) should have a viscosity in the range from 3000 to 30000 centipoise or, preferably, in the range from 5000 to 15000 centipoise at 25° C. When the viscosity thereof is too low, the organopolysiloxane composition formulated with such an organopolysiloxane is defective due to generation of peeling noises in peeling of the releasable paper sheet prepared therewith. When the viscosity thereof is too high, on the other hand, the organopolysiloxane composition formulated therewith would have an unduly high viscosity to cause a difficulty in uniformly coating a substrate with the composition. This requirement for the viscosity can be satisfied by suitably selecting the values of the subscripts d, e and f although d is a positive integer and e and f are each zero or a positive integer by definition.

The first organopolysiloxane as the component (a) represented by the general formula (I) can be prepared, for example, by subjecting a mixture consisting of an organopolysiloxane represented by the general formula

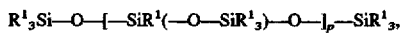

in which $R^1$ has the same meaning as defined before and the subscript p is zero or a positive integer of 1, 2 or 3, and an oligomeric cyclic organopolysiloxane represented by the general formula

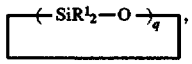

in which $R^1$ has the same meaning as above and the subscript q is a positive integer of 3 to 7, with admixture of methane sulfonic acid or trifluoromethane sulfonic acid as a catalyst in an amount of 0.1 to 2.0% by weight based on the total amount of the two organopolysiloxanes to effect a siloxane rearrangement equilibration reaction for a reaction time of 4 to 10 hours at a reaction temperature of 80° to 100° C. It is essential in conducting this reaction that the organopolysiloxanes as the starting materials and proportion thereof are selected such that the resultant organopolysiloxane as the reaction product may contain the (meth) acryloxyalkyl groups represented by the general formula (II) in an adequate content as described above. The second organopolysiloxane as the component (b) can be synthesized by conducting a dehydrochlorination reaction between an organopolysiloxane corresponding thereto and having amino groups and (meth)acrylic acid chloride in an at least equivalent amount to the organopolysiloxane for a reaction time of 1 to 4 hours at a reaction temperature of 0° to 70° C. It is essential here to adequately select the starting amino group-containing organopolysiloxane such that the resultant organopolysiloxane product may contain an appropriate amount of the (meth)acrylaminoalkyl groups represented by the general formula (IV) as a part of the groups denoted by $R^3$. It is preferable to promote the above mentioned dehydrochlorination reaction by admixing the reaction mixture with a basic compound such as triethyl amine as an acid acceptor.

The weight proportion of the second organopolysiloxane as the component (b) to the first organopolysiloxane as the component (a) in the inventive organopolysiloxane composition is in the range from 10:90 to 40:60 or, preferably, in the range from 20:80 to 30:70. When the amount of the second organopolysiloxane is too small relative to the first organopolysiloxane, the desirable effect that no peeling noise is generated even in heavy peeling cannot be accomplished while, when the relative amount of the second organopolysiloxane is too large, a decrease is caused in the radiation-curability of the organopolysiloxane composition comprising these two organopolysiloxanes.

It is of course optional according to need that the inventive organopolysiloxane composition comprising the above described first and second organopolysiloxanes is admixed with various kinds of known additives including photopolymerization initiators such as acetophenone, benzophenone, 4-chlorobenzophenone and the like, controlling agents against curing inhibition by the atmospheric oxygen such as diethylaminoethyl alcohol, piperidine and the like, reactive diluents, organic solvents, levelling agents, fillers, antistatic agents, antifoam agents, pigments, organopolysiloxanes other than the above defined first and second organopolysiloxanes and so on each in a limited amount.

The organopolysiloxane composition of the present invention can be applied for forming a releasable surface film on a substrate of various kinds of materials including films of plastic resins such as polyesters, polypropylene, polyethylene, polyvinyl chloride, polytetrafluoroethylene, polyimide and the like and sheets of paper such as glassine paper, kraft paper, clay-coated paper and the like as well as paper-based laminates such as polyethylene-laminated wood-free paper, polyethylene-laminated kraft paper and the like.

The coating work on a substrate with the inventive organopolysiloxane composition can be performed by a known method such as roller coating, gravure coating, wire-doctor coating, air-knife coating, dip coating and so on. The coating amount with the inventive composition is preferably in the range from 0.01 to 20.0 g/m². When the coating amount is too small, uniformity in coating cannot be accomplished so that the desired surface-releasing effect can hardly be obtained with reproducibility. When the coating amount is too large, curing of the coating layer is sometimes incomplete due to the decrease in the transmission of electron beams for curing to the depth of the coating layer.

The organopolysiloxane composition of the present invention can be cured by irradiation with various kinds of radiations including electron beams, α-rays, β-rays, γ-rays and ultraviolet lights emitted from mercury arc lamps, medium- or high-pressure mercury lamps and the like. The irradiation dose of radiation to effect full curing of the coating layer can be in the range from 1 to 10 Mrads for electron beams. When ultraviolet light is used as the radiation for curing, it is necessary to admix the organopolysiloxane composition of the invention with a photopolymerization initiator and irradiation of the coating layer is performed for 0.1 to 10 seconds with a high-pressure mercury lamp of 2 kW output or 8 W/cm output per unit length at a distance of 8 cm from the coating layer on the substrate.

In the following, the organopolysiloxane composition of the invention is illustrated in more detail by way of examples, in which the term of "parts" always refers to "parts by weight". The organopolysiloxane compositions prepared in the Examples were evaluated by testing for the following items by the respective testing procedures described there.

CURABILITY

An OPP (oriented polypropylene) film was coated with the organopolysiloxane composition under testing in a coating amount of 1.0 g/m² and the coating layer was cured by the irradiation with electron beams of 165 kV accelerating voltage on an electron-beam irradiating machine (Model C-150, manufactured by ESI Co.) with varied irradiation doses to record the minimum dose in Mrads required for accomplishing full curing of the coating film. Complete curing of the coating layer was assumed when the coating film did not fall or exhibit appearance of dullness in the surface luster by rubbing with a finger tip.

PEELING RESISTANCE AND PEELING NOISE

An OPP film was coated with the organopolysiloxane composition under testing in the same manner as above and the coating film was cured by the irradiation with electron beams in the minimum dose for complete curing determined in the above described curability test to form a fully cured coating film. Thereafter, a hot-melt adhesive tape was attached to the surface of the thus cured coating film followed by aging at 70° C. for 24 hours. Thereafter, the coated OPP film was peeled off from the adhesive tape by pulling on an automatic tensile testing machine in a 180° direction at a pulling velocity of 8 meters/minute to record the force in g/5 cm required for peeling.

The test for generation of peeling noise was performed by undertaking the above described peeling test in a thermostatted noiseless room to audially detect generation of noise thereby. Further, recording was made of the ratio of (maximum peeling force—minimum peeling force)/(average peeling force), referred to as "δ" hereinafter. The maximum and minimum peeling forces above mentioned were so defined as to be the highest and lowest values, respectively, read on a chart of the automatic tensile testing usually giving a vibrating curve for the force.

ADHESIVENESS RETENTION

A cured coating film of the organopolysiloxane composition was formed on the surface of an OPP film in the same manner as in the test of the peeling resistance described above and a polyesterbase pressure-sensitive adhesive tape (Lumirror 31B, a product by Nitto Denko Co.) was attached and bonded thereto followed by a heat treatment at 70° C. for 20 hours under a weight of 20 g/cm² mounted thereon Thereafter, the adhesive tape was taken off by peeling and attached and bonded again to a well-polished stainless steel plate followed by peeling of the adhesive tape off the stainless steel plate to record the force required for peeling of the adhesive tape from the stainless steel plate. Separately, a fresh portion of the same pressure-sensitive adhesive tape was attached and bonded to the clean surface of a stainless steel plate and then peeled off to record the force required for peeling of the adhesive tape from the stainless steel plate. The ratio of the former value of the peeling force to the value of the latter peeling force was calculated and recorded as the adhesiveness retention in %.

In the following, the organopolysiloxane compositions were prepared from one or two selected from five kinds of organopolysiloxanes, referred to as the Siloxanes-I to -V hereinafter, expressed by the respective average unit formulas and characterized in Table 1 below.

Siloxane-I: $M_2D^A{}_{18}D_{80}$

Siloxane-II: $M_2D^A{}_{18}D_{180}$

Siloxane-III: $M^{AA}{}_2D_{160}$

Siloxane-IV: $M^{AA}{}_2D_{450}$

Siloxane-V: $M^{AA}{}_2D^{AA}{}_2D_{448}$

The symbols in the above given average unit formulas denote the following organosiloxane units, respectively, in which Me is a methyl group.

M: $Me_3SiO_{1/2}$—

$M^{AA}$: $CH_2=CH-CO-NH-C_3H_6-SiMe_2O_{1/2}$

D: —$SiMe_2$—O—

$D^A$: —SiMe(—$C_3H_6$—O—CO—CH=$CH_2$)—O—

$D^{AA}$: —SiMe(—$C_3H_6$—NH—CO—CH=$CH_2$)—O—

TABLE 1

| | Average degree of polymerization | Content of functional groups, % by moles* | Viscosity, centipoise at 25° C. | Refractive index, at 25° C. |
|---|---|---|---|---|
| Siloxane-I | 100 | 8.9 | 230 | 1.427 |
| Siloxane-II | 200 | 4.5 | 400 | 1.415 |
| Siloxane-III | 162 | 0.6 | 1100 | 1.406 |
| Siloxane-IV | 452 | 0.2 | 7300 | 1.405 |
| Siloxane-V | 452 | 0.4 | 9500 | 1.409 |

*)content of the groups represented by the general formula (II) or (IV) relative to overall silicon-bonded organic groups EXAMPLES 1 and 2

Radiation-curable organopolysiloxane compositions were prepared by uniformly blending 70 parts of the Siloxane-I and 30 parts of the Siloxane-IV or Siloxane-V in Examples 1 and 2, respectively. These organopolysiloxane compositions were subjected to the evaluation tests to give the results shown in Table 2 below.

COMPARATIVE EXAMPLES 1 to 3

The organopolysiloxanes subjected to the evaluation tests in Comparative Examples 1, 2 and 3 were: the Siloxane-I alone; blend of 70 parts of the Siloxane-II and 30 parts of the Siloxane-III and blend of 70 parts of the Siloxane-I and 30 parts of the Siloxane-III, respectively. The results of the evaluation tests are also shown in Table 2.

TABLE 2

| | Curability, Mrads | Peeling resistance, g/5 cm | Adhesiveness retention, % | Peeling noise | |
|---|---|---|---|---|---|
| | | | | noise | δ |
| Example | | | | | |
| 1 | 4.5 | 44 | 90 | no | <0.1 |
| 2 | 3.5 | 50 | 98 | no | <0.1 |
| Comparative Example | | | | | |
| 1 | 2.5 | 58 | 100 | yes | 0.5 |
| 2 | 6.0 | 42 | 89 | no | <0.1 |
| 3 | 4.5 | 50 | 93 | yes | 0.3 |

What is claimed is:

1. A radiation-curable organopolysiloxane composition which comprises, as a uniform blend:

(a) a first organopolysiloxane having a viscosity in the range from 100 to 3000 centipoise at 25° C. and represented by the general formula $R^1{}_3Si-O-(-SiR^1{}_2-O-)_a-(-SiR^1Q^1-O-)_c-SiR^1{}_3$, in which $Q^1$ is a group represented by the general formula —O—(—$SiR^1{}_2$—O—)$_b$—$SiR^1{}_3$, $R^1$ is an atom or group selected from the group consisting of a hydrogen atom, alkyl groups having 1 to 4 carbon atoms, a phenyl group and an ω-(meth)acryloxyalkyl group represented by the general formula —$C_nH_{2n}$—O—CO—$CR^2$=$CH_2$, $R^2$ being a hydrogen atom or a methyl group and the subscript n being an integer of 1, 2 or 3, with the proviso that from 5 to 20% in number of the groups denoted by $R^1$ in a molecule are the ω-(meth)acryloxyalkyl groups, the subscript a is a positive integer and the subscripts b and c are each zero or a positive integer; and (b) a second organopolysiloxane having a viscosity in the range from 3000 to 30000 centipoise at 25° C. and represented by the general formula

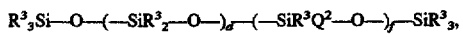

in which $Q^2$ is a group represented by the general formula

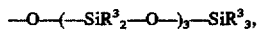

in which $R^3$ is an atom or group selected from the group consisting of a hydrogen atom, alkyl groups having 1 to 4 carbon atoms, a phenyl group and an ω-(meth)acrylaminoalkyl group represented by the general formula

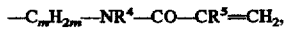

$R^4$ being a hydrogen atom or an alkyl group having 1 to 4 carbon atoms, $R^5$ being a hydrogen atom or a methyl group and the subscript m being an integer of 1, 2 or 3, with the proviso that at least one but not exceeding 3% in number of the groups denoted by $R^3$ in a molecule are the ω-(meth)acrylaminoalkyl groups, the subscript d is a positive integer and the subscripts e and f are each zero or a positive integer, in a weight proportion of the component (b) to the component (a) in the range from 10:90 to 40:60.

2. The radiation-curable organopolysiloxane composition as claimed in claim 1 in which the subscript n is 3.

3. The radiation-curable organopolysiloxane composition as claimed in claim 1 in which $R^2$ is a hydrogen atom.

4. The radiation-curable organopolysiloxane composition as claimed in claim 1 in which the groups denoted by $R^1$ other than the ω-(meth)acryloxyalkyl groups are methyl groups.

5. The radiation-curable organopolysiloxane composition as claimed in claim 1 in which the subscript c is zero or 1.

6. The radiation-curable organopolysiloxane composition as claimed in claim 1 in which from 8 to 15% by moles of the groups denoted by $R^1$ are the (meth)acryloxyalkyl groups.

7. The radiation-curable organopolysiloxane composition as claimed in claim 1 in which the subscript m is 3.

8. The radiation-curable organopolysiloxane composition as claimed in claim 1 in which $R^5$ is a hydrogen atom.

9. The radiation-curable organopolysiloxane composition as claimed in claim 1 in which the groups denoted by $R^3$ other than the ω-(meth)acrylaminoalkyl groups are methyl groups.

10. The radiation-curable organopolysiloxane composition as claimed in claim 1 in which the subscript f is zero or 1.

11. The radiation-curable organopolysiloxane composition as claimed in claim 1 in which from 0.1 to 1% by moles of the groups denoted by $R^3$ are the (meth)acrylaminoalkyl groups.

12. The radiation-curable organopolysiloxane composition as claimed in claim 1 in which the first organopolysiloxane as the component (a) has a viscosity in the range from 200 to 1000 centipoise at 25° C.

13. The radiation-curable organopolysiloxane composition as claimed in claim 1 in which the second organopolysiloxane as the component (b) has a viscosity in the range from 5000 to 15000 centipoise at 25° C.

14. A radiation-curable organopolysiloxane composition as claimed in claim 1, wherein the weight proportion of component (b) to the component (a) is in the range of from 20:80 to 30:70.

* * * * *